United States Patent Office 2,890,576
Patented June 16, 1959

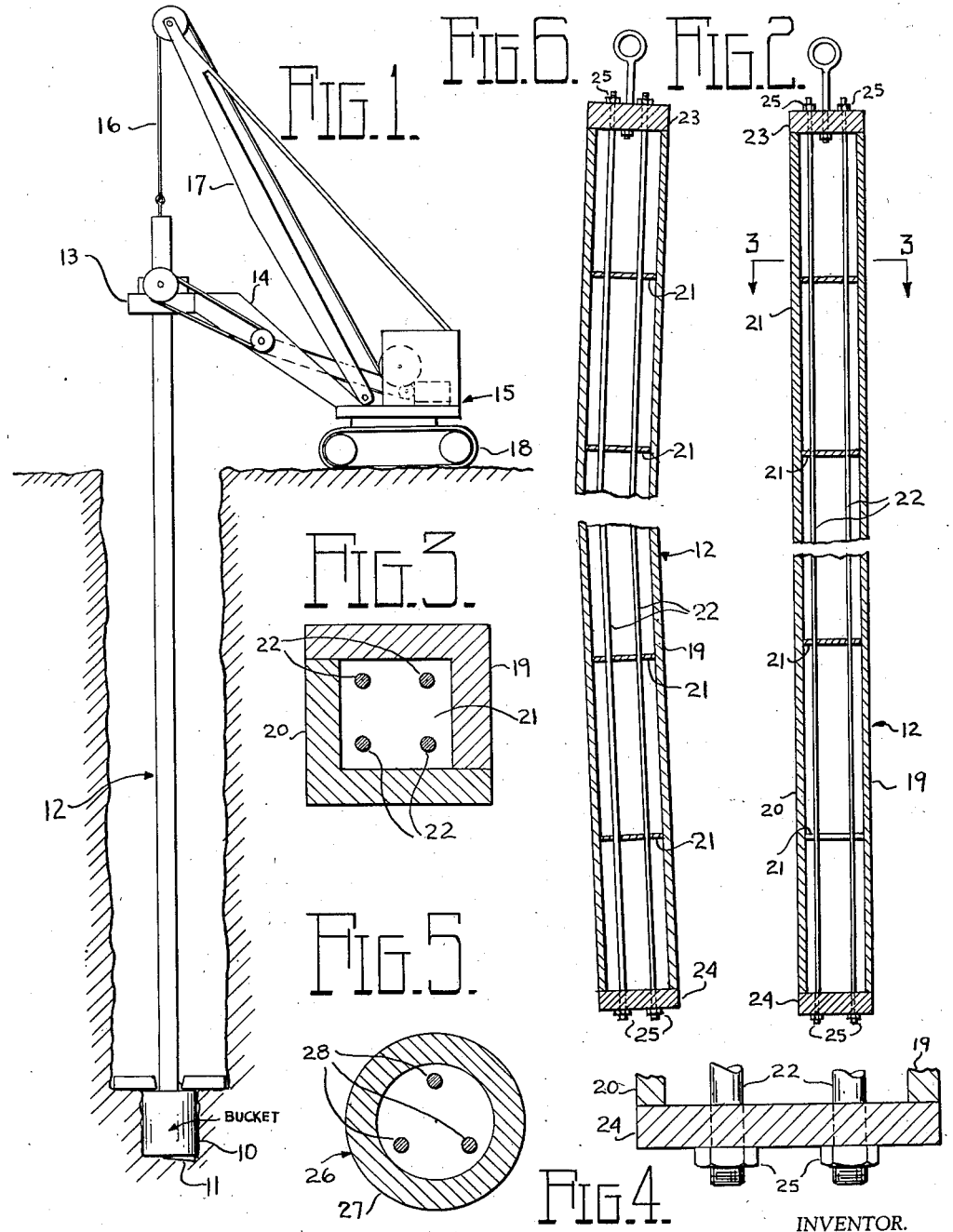
INVENTOR.
ANDERTON L. BENTLEY JR.

2,890,576

TORQUE TRANSMITTING ASSEMBLY

Anderton Lewis Bentley, Jr., Perrysburg, Ohio, assignor to A. Bentley & Sons Company, Toledo, Ohio, a corporation of Ohio Application April 15, 1957, Serial No. 652,739

6 Claims. (Cl. 64—1)

This invention relates to a torque transmitting assembly, and, more particularly, to such an assembly which includes a torque transmitting member which is prestressed in compression to prevent or minimize whipping thereof during operation.

In many installations where torque must be transmitted through a relatively long shaft or member, and in particular where it is impossible to employ a torque transmitting shaft or member which is fabricated to close tolerances and precisely balanced, whipping of the shaft or member has been found to be a serious problem. In hole digging- or earth boring-apparatus, for example of the type disclosed in U.S. Patents 2,631,013 and 2,719,698, the problem of whipping of a torque transfer member has been found to be extremely serious in many instances when relatively deep holes are required, for example to receive pilings or other supports for heavy buildings. A similar problem is also encountered with other assemblies comprising relatively long torque transfer members.

The present invention is based upon the discovery that whipping of a torque transfer member can be prevented or minimized, even though the member is unbalanced, by appropriately prestressing the member in compression.

It is, therefore, an object of the invention to provide an improved torque transfer assembly.

It is a further object of the invention to provide an improved torque transfer assembly comprising a torque transfer member which is appropriately prestressed in compression.

Other objects and advantages will be apparent from the description which follows, reference being had to the accompanying drawings, in which—

Fig. 1 is a view showing, partly in elevation and partly in vertical section, a torque transfer member in operating position, and associated means for positioning and driving the member;

Fig. 2 is an enlarged view in vertical section showing the torque transfer member of Fig. 1;

Fig. 3 is a view in horizontal section along the line 3—3 of Fig. 2;

Fig. 4 is a view in vertical section showing, to an enlarged scale, a portion of the member of Fig. 2;

Fig. 5 is a view in horizontal section similar to Fig. 3, but showing a modified shape of torque transfer member; and Fig. 6 is a view similar to Fig. 2, but showing the torque transfer member in a position which it might assume if it "whipped."

Referring now in more detail to the drawings, and particularly to Fig. 1, a hole digging- or earth boring-apparatus there shown includes a digging bucket 10 having one or more bottom dump doors 11 provided with cutting edges effective to move earth from the bottom of an associated hole upon rotation of the bucket and to force the earth into the bucket. The bucket might also, if desired, be provided with outwardly movable side cutting blades effective to enlarge the hole laterally at its bottom or at any intermediate point. The bucket 10 is mounted at the lower extremity of a torque transfer member 12, which is usually denominated a "kelly" in the art, and can be rotated and moved in any desired direction thereby. The kelly 12 is connected to be driven by a rotary table 13 mounted in any suitable manner on a table boom 14 of an excavating machine indicated generally at 15. The kelly 12 can be raised, lowered, or supported in a desired position by a cable 16 operatively associated with a hoist boom 17 of the machine 15. The machine 15 is mounted on crawler tracks 18, and carries suitable power equipment and drive means for effecting rotation of the kelly 12, raising or lowering thereof, and for moving the machine from one location to another, all as well known in the art.

Referring now in more detail to Figs. 2, 3 and 4, the kelly 12, in the specific embodiment of the invention shown, is composed of two angle irons 19 and 20, welded together, so that the kelly is square in cross-section with a central void extending longitudinally therethrough. Guiding and reinforcing means 21 are provided in the kelly, longitudinally spaced within the void. Prestressing means 22, which can be steel cables or rods, for example, extend through the interior of the kelly 12, and through appropriate openings in the guide means or plates 21, which, therefore, serve to position the prestressing elements within the kelly. At the upper and lower extremities of the kelly 12, the prestressing elements pass through appropriate openings in plate means 23 and 24, respectively, and threaded retainers 25 are turned thereon and tightened to apply any desired load to the cables or rods which are thereby stressed in tension. The prestressing elements pass freely through the guide means 21 and the plate means 23 and 24, so that the entire stress applied thereto is transmitted through the plate means 23 and 24 to prestress the torque transfer member 12 in compression. Such prestressing has been found to eliminate or greatly reduce whipping of the torque transfer member or kelly 12 in most instances. Even when the member 12 is badly unbalanced or is very long the present invention has been found to reduce whipping to within limits which can be tolerated. In the art as it is known at present, kellys have been limited to about 90 feet in length because it has been found that longer units whip so badly as to be dangerous and generally unsatisfactory. The present invention extends the useful length of such devices sufficiently to permit boring of holes at least 250 feet deep without danger and without risk of breaking the equipment.

Referring now to Fig. 6, the member 12 is shown in a position which it might assume if whipping occurred. It will be observed that the member is shown as bowed outwardly to the left, and that, in such position, each of the prestressing means 22 has been urged to the left at points intermediate its ends by the various guide means or plates 21. Such movement is resisted by the prestressing means, which would be lengthened, and placed under correspondingly increased tension thereby. In the member 12, therefore, any movement incident to whipping urges the plates 21 against and tends to length, the prestressing means 22, thereby setting up a reactive force which is transmitted through the plates to the wall of the member 12 and opposes the whipping or lateral movement thereof.

While the invention has thus far been described with reference to the prestressing of a specifically constructed kelly or torque transfer member 12 which is hollow, is square in cross-section, and has prestressing means extending therethrough, the member can, if desired, be circular in cross-section, as is a torque transfer member indicated generally at 26 in Fig. 5. The member 26, which may be a long shaft or the like, can be made from lengths 27 of pipe or tubing, and prestressed in the same manner as the kelly 12 by applying tension to prestressing means 28, which can be rods, stranded cable, or any other tension medium. It will be apparent that various other changes and modifications can be made from the specific details shown in the drawings and discussed in connection therewith without departing from the spirit and scope of the attached claims. For example, the torque transfer member can be solid, and the prestressing means can be appropriately associated therewith and extend along the exterior thereof. The member can be used in apparatus of any desired type other than hole drilling- or earth boring-apparatus. For example, many devices such as propeller shafts on ships are, in effect, long torque transfer members where whipping is a problem and can be minimized by prestressing in accordance with the invention. Other changes and modifications will be apparent to one skilled in the art.

What I claim is:

1. In a torque transfer assembly comprising a driving means, a longitudinally extending torque transfer member operatively associated with the driving means, and a driven member operatively associated with the torque transfer member at a position sufficiently remote spatially from the driving means that the torque transfer member is subject to whipping, whereby rotation of the driving means causes rotation of the torque transfer member, generally about its longitudinal axis, and rotation of the driven member, the improvement which comprises a torque transfer member generally square in cross-section, and having a central void extending longitudinally therethrough, removable plate means on each end of said torque transfer member, force transmitting means positioned in the void in said torque transfer member, prestressing elements extending through the central longitudinal void of the torque transfer member, through said force transmitting means, and through said plate means, and positioned by said force transmitting means and by said plate means in a predetermined relationship to said torque transfer member, and means operatively associated with the torque transfer member and with said prestressing elements, and effective to stress the latter in tension and to transmit the tension through said removable plate means to said torque transmitting member, which is thereby stressed in compression substantially throughout its length, whereby lateral bending of the torque transfer member tends to increase the tension in said prestressing elements and to set up a reactive force which resists such lateral bending.

2. In a torque transfer assembly comprising a driving means, a longitudinally extending torque transfer member operatively associated with the driving means, and a driven member operatively associated with the torque transfer member at a position sufficiently remote spatially from the driving means that the torque transfer member is subject to whipping, whereby rotation of the driving means causes rotation of the torque transfer member, generally about its longitudinal axis, and rotation of the driven member, the improvement which comprises a torque transfer member having a central void extending longitudinally therethrough, plate means on each end of said torque transfer member, force transmitting means positioned in the void in said torque transfer member, prestressing elements extending through the central longitudinal void of the torque transfer member, through said force transmitting means, and through said plate means, and positioned by said force transmitting means and by said plate means in a predetermined relationship to said torque transfer member, and means operatively associated with the said torque transfer member and with said prestressing elements, and effective to stress the latter in tension and to transmit the tension to said torque transmitting member, which is thereby stressed in compression substantially throughout its length, whereby lateral bending of the torque transfer member tends to increase the tension in said prestressing elements and to set up a reactive force which resists such lateral bending.

3. In a torque transfer assembly comprising a driving means, a longitudinally extending torque transfer member operatively associated with the driving means, and a driven member operatively associated with the torque transfer member at a position sufficiently remote spatially from the driving means that the torque transfer member is subject to whipping, whereby rotation of the driving means causes rotation of the torque transfer member, generally about its longitudinal axis, and rotation of the driven member, the improvement which comprises a torque transfer member having a central void extending longitudinally therethrough, force transmitting means positioned in the void in said torque transfer member, prestressing elements extending through the central longitudinal void of the torque transfer member and through the said force transmitting means, and positioned by said force transmitting means in a predetermined relationship to said torque transfer member, and means operatively associated with the said torque transfer member and with said prestressing elements, and effective to stress the latter in tension and to transmit the tension to said torque transmitting member, which is thereby stressed in compression substantially throughout its length, whereby lateral bending of the torque transfer member tends to increase the tension in said prestressing elements and to set up a reactive force which resists such lateral bending.

4. In a torque transfer assembly comprising a driving means, a longitudinally extending torque transfer member operatively associated with the driving means, and a driven member operatively associated with the torque transfer member at a position sufficiently remote spatially from the driving means that the torque transfer member is subject to whipping, whereby rotation of the driving means causes rotation of the torque transfer member, generally about its longitudinal axis, and rotation of the driven member, the improvement which comprises prestressing means extending longitudinally of the torque transfer member, force transmitting means operatively associated with said prestressing means and with the torque transfer member and effective to position the former in a predetermined relationship to the latter, and means operatively associated with the torque transfer member and with said prestressing means, and effective to stress the latter in tension and to transmit the tension to said torque transmitting member, which is thereby stressed in compression substantially throughout its length, whereby lateral bending of the torque transfer member tends to increase the tension in said prestressing elements and to set up a reactive force which resists such lateral bending.

5. In a torque transfer assembly comprising a driving means, a longitudinally extending torque transfer member operatively associated with the driving means, and a driven member operatively associated with the torque transfer member at a position sufficiently remote spatially from the driving means that the torque transfer member is subject to whipping, whereby rotation of the driving means causes rotation of the torque transfer member, generally about its longitudinal axis, and rotation of the driven member, the improvement which comprises prestressing means extending longitudinally of the torque transfer member, force transmitting means operatively associated with said prestressing means and with the torque transfer member and effective to position the former in a predetermined relationship to the latter, and means operatively associated with the torque transfer member and with said prestressing means, and effective to stress the latter in tension and to transmit the tension to said torque transmitting member, which is thereby stressed in compression, whereby lateral bending of the torque transfer member tends to increase the tension in said prestressing elements and to set up a reactive force which resists such lateral bending.

6. A torque transfer assembly comprising a longitudinally extending torque transfer member of sufficient length to be subject to a whipping, prestressing means extending longitudinally of said member, force transmitting means operatively associated with said prestressing means and with the torque transfer member and effective to position the former in a predetermined relationship to the latter, and means operatively associated with said member and with said prestressing means, and effective to stress the latter in tension and to transmit the tension to the said member, which is thereby stressed in compression, whereby lateral bending of the torque transfer member tends to increase the tension in said prestressing elements and to set up a reactive force which resists such lateral bending.

References Cited in the file of this patent

UNITED STATES PATENTS

| | | |
|---|---|---|
| 306,472 | Feith | Oct. 14, 1884 |
| 1,876,627 | Davis et al. | Sept. 13, 1932 |
| 2,234,454 | Richter | Mar. 11, 1941 |
| 2,518,481 | Maguire | Aug. 15, 1950 |